(12) United States Patent
Liang et al.

(10) Patent No.: US 10,107,673 B2
(45) Date of Patent: Oct. 23, 2018

(54) ATTACHABLE WEIGHING SCALE FOR FORKLIFTS

(71) Applicants: Charles Liang, Buffalo Grove, IL (US); Xiangjun Xu, Buffalo Grove, IL (US)

(72) Inventors: Charles Liang, Buffalo Grove, IL (US); Xiangjun Xu, Buffalo Grove, IL (US)

( * ) Notice: Subject to any disclaimer, the term of this patent is extended or adjusted under 35 U.S.C. 154(b) by 161 days.

(21) Appl. No.: 15/068,253

(22) Filed: Mar. 11, 2016

(65) Prior Publication Data

US 2017/0261364 A1 Sep. 14, 2017

(51) Int. Cl.
*G01G 19/08* (2006.01)
*G01G 3/14* (2006.01)

(52) U.S. Cl.
CPC .......... *G01G 19/083* (2013.01); *G01G 3/1402* (2013.01)

(58) Field of Classification Search
CPC ................ G01G 19/083; G01G 3/1402
See application file for complete search history.

(56) References Cited

U.S. PATENT DOCUMENTS

| 6,600,111 B2* | 7/2003 | Simons | G01G 19/083 177/139 |
| 6,730,861 B1* | 5/2004 | Simons | G01G 19/083 177/136 |
| 8,957,329 B2* | 2/2015 | Simons | B62B 3/06 177/137 |
| 9,878,888 B2* | 1/2018 | Giannetti | B66F 9/0755 |
| 2003/0234122 A1* | 12/2003 | Kroll | B66F 17/003 177/146 |
| 2007/0041820 A1* | 2/2007 | Simons | B66F 9/12 414/647 |
| 2008/0178690 A1* | 7/2008 | Simons | G01G 19/083 73/862.541 |
| 2015/0344277 A1* | 12/2015 | Simons | B66F 9/12 414/21 |
| 2016/0084697 A1* | 3/2016 | Giannetti | B66F 9/0755 177/139 |

\* cited by examiner

*Primary Examiner* — Natalie Huls

(57) ABSTRACT

An attachable weighing scale for forklifts has a plurality of weighing modules connected within an outer cover. The weighing modules are connected to the forks of a forklift within the outer cover around the forks in order to facilitate weighing of loads.

11 Claims, 6 Drawing Sheets

ATTACHABLE WEIGHING SCALE FOR FORKLIFTS

FIELD OF THE INVENTION

The present invention relates generally to forklifts. More particularly, the present invention relates to weighing forklift loads.

BACKGROUND OF THE INVENTION

A forklift is a powered industrial vehicle used to lift and move heavy of bulky materials short distances. A typical forklift has two side by side "forks", also known as blades or tines, which are L-shaped metal pieces which perform the actual lifting action. Forklifts are a critical element of warehouses and distribution center. Forklifts are rated for loads at a specified maximum weight and a specified center of gravity. Stability of the forklift is a crucial characteristic that must be carefully managed in order to prevent incidents where the load may fall of the forks or the whole forklift may even tip over due to an improperly balanced load or a load that exceeds the weight the forklift is rated to handle. It is therefore highly desirable to ascertain the weight of a load before handling it in order to make sure the load is safe for the forklift to move. The present invention seeks to address this concern through a conversion kit that attaches to the tines of a forklift and measures loads placed on the forklift without any mechanical modification.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is a weight scale for forklifts, including an elongated sleeve having built in loadcells as sensing elements for accurate weighing. The present invention enables a typical forklift to be converted into a forklift weighing scale without performing any mechanical modification to the forklift itself in a low cost, quick installation and high precision manner.

The present invention is herein presented as a singular unit for one fork; however, it should be understood that typical forklifts have two forks, and thus two of the present should be installed onto the two forks of a forklift to properly enable the functionality of the present invention.

Figure 1:
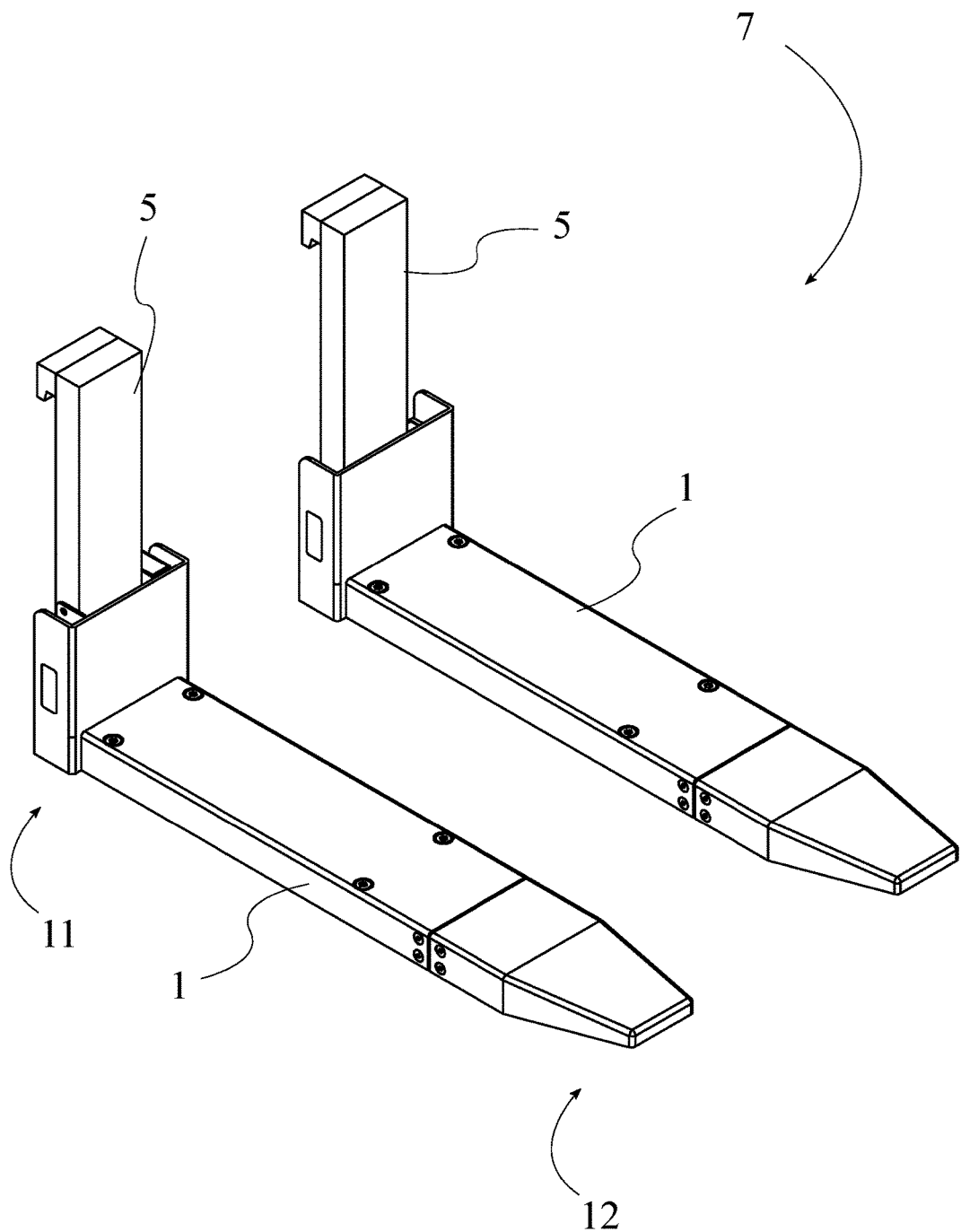
FIG. 1 is a perspective view of the first embodiment of the present invention installed onto two forks.
Figure 2:
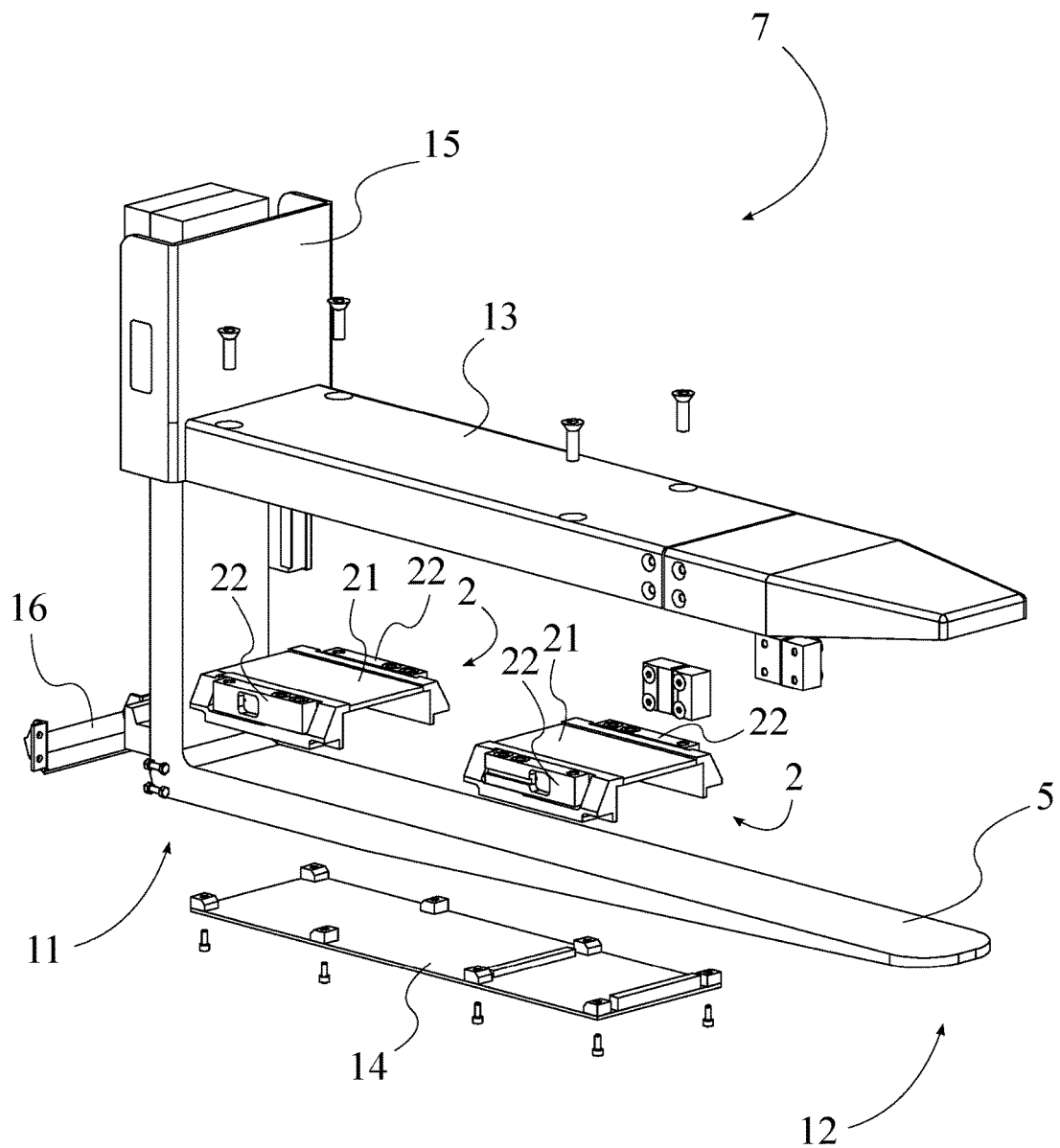
FIG. 2 is a perspective exploded view of the first embodiment of the present invention.
Figure 3:
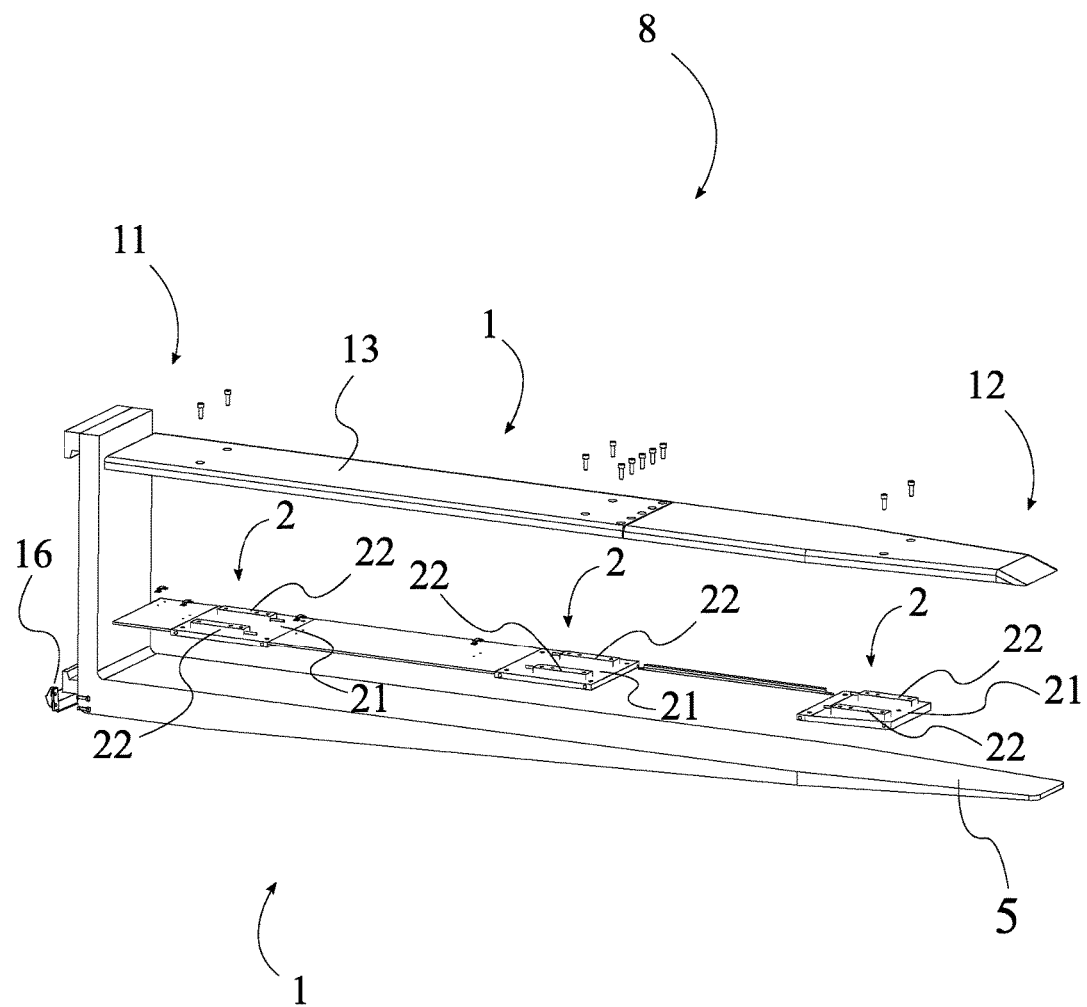
FIG. 3 is a perspective exploded view of the second embodiment of the present invention.
Figure 4:
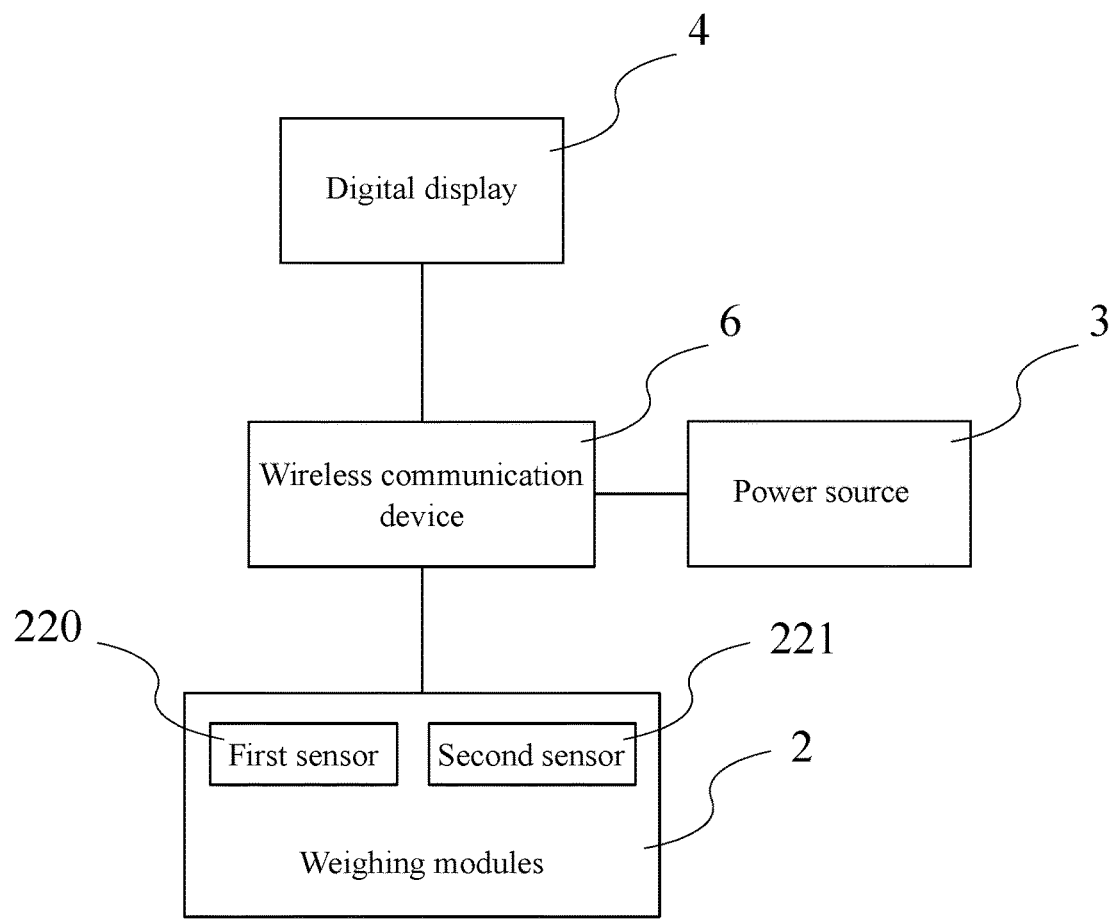
FIG. 4 is a schematic diagram of the electrical connections of the present invention.

Referring to FIGS. 1-4, the present invention generally comprises an outer cover 1, a plurality of weighing modules 2, a power source 3, and a digital display 4. The outer cover 1 is the elongated sleeve of the present invention, covering the weighing modules 2, any wiring and other internal components and serving as a buffer between the internal components and any load to be lifted and weight by the forklift. The outer cover 1 is shaped and configured to fit over a fork 5 of a forklift. The outer cover 1 may comprise a plurality of longitudinal portions which can be connected to each other in order to accommodate different sized forks 5. The plurality of weighing modules 2 comprise the sensors necessary to ascertain the weight of a load. FIGS. 1-2 show a first embodiment 7 and FIG. 3 shows a second embodiment 8.

The digital display 4 shows users the weight measured by the weighing modules 2. The power source 3 may be a battery for wireless operation, or the power source 3 may be a wired connection to a separate external power source 3. Additionally, the present invention may be wired or wireless. The sensor modules may be connected to the digital display 4 or another processing unit by physical wired connections, or through a wireless communication device 6 such as but not limited to a radio frequency transmitter. The wireless communication device 6 is electrically connected to the power source 3, the wireless communication device 6 is electronically connected to each of the weighing modules 2, and the wireless communication device 6 is communicatively coupled to the digital display 4. Each of the weighing modules 2 may be have their own wireless communication device 6, or the weighing modules 2 may all be connected to a singular wireless communication device 6.

Figure 5:
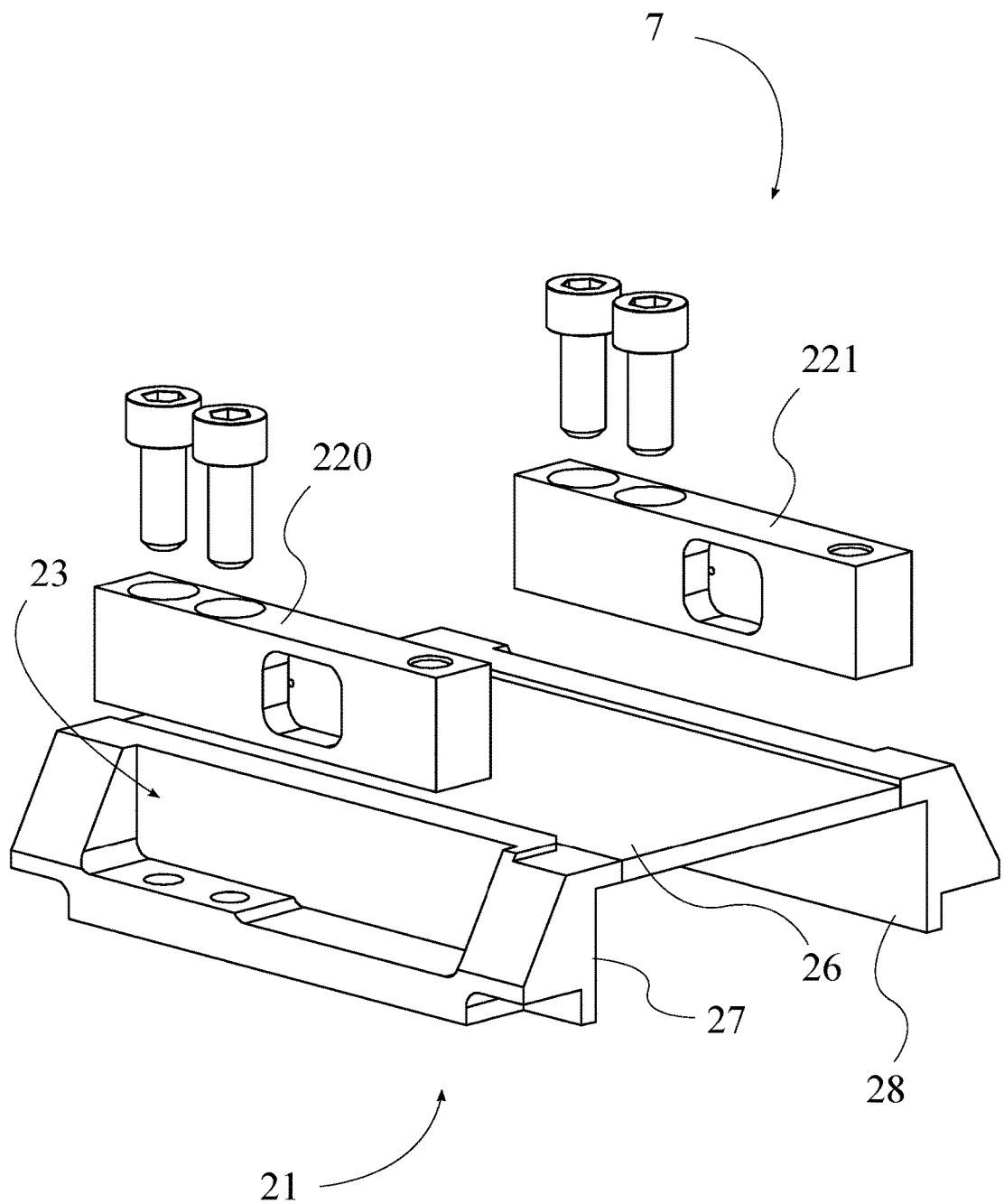
FIG. 5 is an exploded view of a weighing module of the first embodiment of the present invention.
Figure 6:
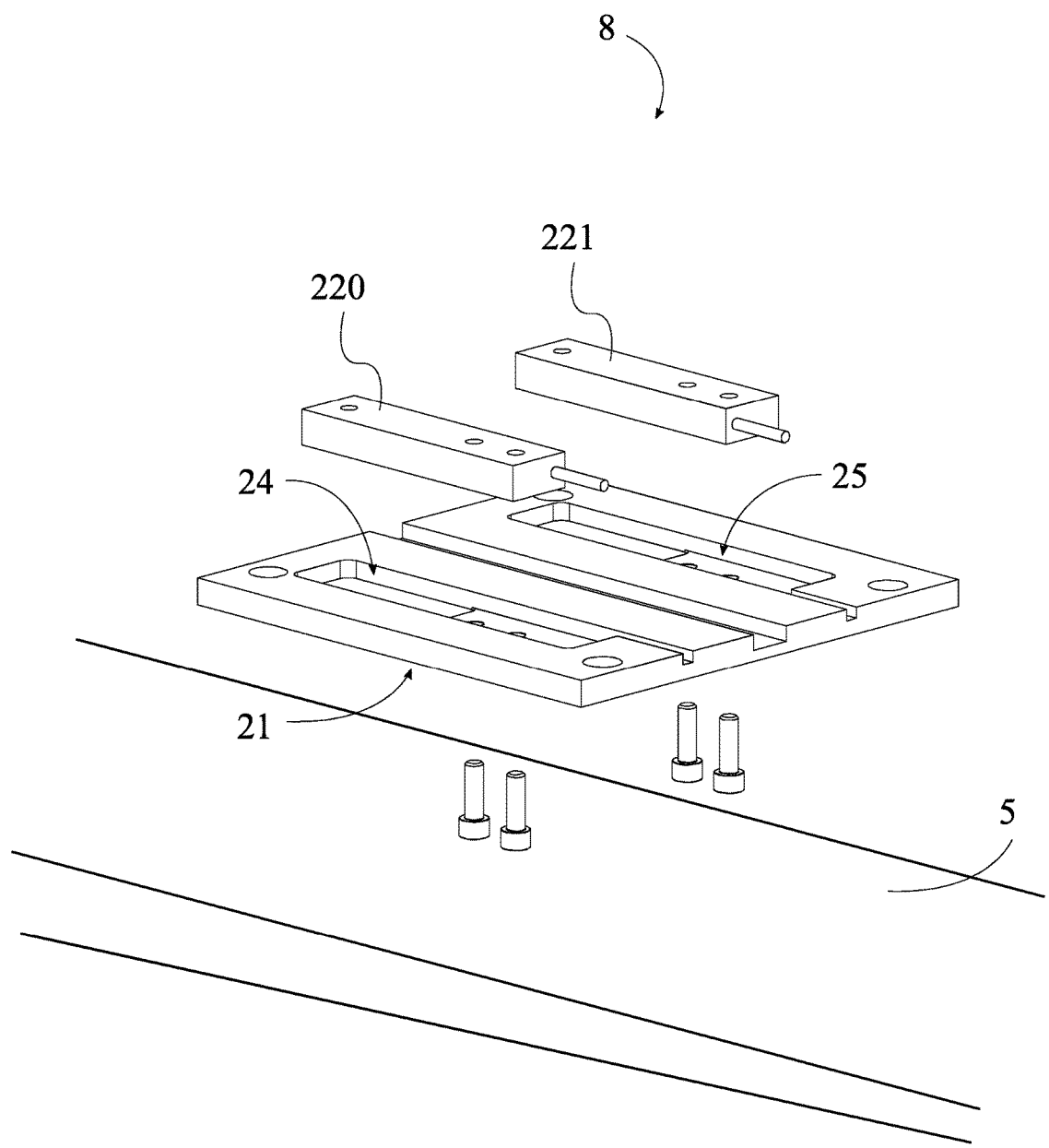
FIG. 6 is an exploded view of a weighing module of the second embodiment of the present invention.

Referring to FIGS. 2-3 and 5-6, in one embodiment of the present invention, each of the plurality of weighing modules 2 comprises a sensor base 21 and at least one weighing sensor 22. The sensor base 21 is a structural component that serves to support the weighing sensors 22 in place within the outer cover 1. Each of the weighing sensors 22 is preferably a strain gauge; however, it is contemplated that any type of sensor which can accurately determine the weight of a forklift load may be utilized in other embodiments. Each of the at least one weighing sensor 22 is connected within one of the sensor receiving portions 23 of the sensor base 21. FIG. 5 shows an exploded view of a weighing module of the first embodiment 7 and FIG. 6 shows an exploded view of a weighing module of the second embodiment 8.

The sensor base 21 comprises at least one sensor receiving portion 23, and each of the weighing sensors 22 are connected within one of the sensor receiving portions 23. In one embodiment of the present invention, the at least one sensor receiving portion 23 comprises a first sensor receiving portion 24 and a second sensor receiving portion 25, and the at least one weighing sensor 22 comprises a first sensor 220 and a second sensor 221. Thus, the first sensor 220 is connected within the first sensor receiving portion 24, and the second sensor 221 is connected within the second sensor receiving portion 25.

The plurality of weighing modules 2 are evenly and linearly separated from each other between a proximal end 11 and a distal end 12 of the outer cover 1 in order to provide sensing coverage across the length of the fork 5 and to increase accuracy. The proximal end 11 of the outer cover 1 should be understood to be the end closest to the vertical portion of the fork 5 when the present invention is installed onto the fork 5. The distal end 12 of the outer cover 1 is the end of the outer cover 1 opposite the proximal end 11, adjacent to the tip of the fork 5. In one embodiment, at least two weighing modules 2 are comprised. However, any number of weighing modules 2 greater than two may be utilized as called for by the length of the fork 5. In one embodiment of the present invention shown in FIG. 3, three weighing modules 2 are comprised, for example. Each of the weighing modules 2 is connected to the outer cover 1, with the weighing sensors 22 being positioned adjacent to the outer cover 1, opposite the fork 5. The power source 3 is electrically connected to the plurality of weighing modules 2, and each of the weighing modules 2 is electrically connected to the digital display 4.

Two embodiments of the present invention will hereinafter be disclosed. In the first embodiment 7, the weighing sensors 22 are positioned at the sides of the fork 5, and in the second embodiment 8, the weighing sensors 22 are positioned atop the fork 5. The outer cover 1 acts as a sheath which can be slid over or assembled onto the fork 5, enclosing the fork 5 and the weighing modules 2.

In the first embodiment 7 of the present invention, the outer cover 1 comprises a top cover portion 13 and a bottom cover portion 14. Preferably, the bottom cover portion 14 is connected to the top cover by the weighing modules 2, wherein the fork 5 is positioned between the bottom cover portion 14 and the weighing modules 2, and wherein the weighing modules 2 are positioned between the fork 5 and the outer cover 1. The weighing modules 2 are each connected to both the top cover portion 13 and the bottom cover portion 14, thus coupling the top cover portion 13 and the bottom cover portion 14 together. More particularly, the weighing sensors 22 of each weighing module are connected to the top cover portion 13, and the sensor base 21 of each weighing module is connected to the bottom cover portion 14. It is contemplated that the particular means of affixing the weighing modules 2, the bottom cover portion 14 and the top cover portion 13 in place is not of paramount importance and may be alternatively embodied, such as, but not limited to, the top cover portion 13 and the bottom cover portion 14 being directly connected to each other instead of by proxy through the weighing modules 2.

The outer cover 1 further comprises a locking bracket 16. The locking bracket 16 is attached to the proximal end 11, preferably removably attached using fasteners such as nuts and bolts or a locking mechanism, wherein a rear portion of the fork 5 is held between the outer cover 1 and the locking bracket 16 in order to lock the outer cover 1 in place on the fork 5. Additionally, the outer cover 1 further comprises a rear cover portion 15 that is perpendicularly connected to the top cover portion 13 at the proximal end 11. The power source 3 may be connected within the rear cover portion 15, if the power source 3 is a battery. Further components necessary for the implementation of the operation of the present invention may also be housed within the rear cover portion 15, such as, but not limited to, a control panel, wiring, circuit boards, cable management terminals, or other components.

Referring to FIG. 5, in the first embodiment 7, the weighing modules 2 have a general upside-down U shape and slide over the fork 5, resulting in the sensors being positioned adjacent to the lateral sides of the fork 5 in a saddled configuration. To this end, the sensor base 21 further comprises a central portion 26, a first side wall 27 and a second side wall 28. The at least one sensor receiving portion 23 of the sensor base 21 comprises a first sensor receiving portion 24 and a second sensor receiving portion 25. The first side wall 27 and the second side wall 28 are oriented perpendicular to the central portion 26. The first side wall 27 and the second side wall 28 are connected to the central portion 26 opposite each other along the central portion 26. Thus, the sensor base 21 is configured to receive the fork 5 between the first side wall 27 and the second side wall 28.

The first sensor receiving portion 24 is positioned adjacent to the first side wall 27 opposite the central portion 26, and similarly the second sensor receiving portion 25 of the sensor base 21 is positioned adjacent to the second side wall 28 opposite the central portion 26. The first sensor 220 is connected within the first sensor receiving portion 24, and the second sensor 221 is connected within the second sensor receiving portion 25. In the first embodiment 7, the first sensor receiving portion 24 and the second sensor receiving portion 25 resemble shelves upon which the first sensor 220 and the second sensor 221 rest, respectively.

In the first embodiment 7 of the present invention, the first 200 and second sensor 221 are fastened within the first and second sensor receiving portions 25 by a plurality of screws traversing through the sensors and into the sensor base 21. The top cover portion 13 of the outer cover 1 is further fastened to the sensors by at least one screw traversing through the top cover portion 13 and into the sensors. Furthermore, the bottom cover portion 14 is fastened to the sensor base 21 by a plurality of screws traversing through the bottom cover portion 14 and into the corners of the sensor base 21.

In a second embodiment 8, the sensor base 21 of the weighing modules 2 in the second embodiment 8 do not saddle over the fork 5 and instead are substantially flat. The first sensor receiving portion 24 and the second sensor receiving portion 25 of the sensor base 21 in the second embodiment 8 are slots or indentations in the top surface of the sensor base 21 and are symmetrically and laterally positioned with each other on the sensor base 21. The first sensor 220 and the second sensor 221 are affixed within the first sensor receiving portion 24 and the second sensor receiving portion 25, respectively, by one or more screws traversing through the bottom of the sensor base 21 and into the first sensor 220 and second sensor 221.

In the second embodiment 8, the weighing modules 2 may be preassembled onto a module base, which is a flat piece of metal. The module base may also comprise various components for cable management, such as, but not limited to, one or more line pipes and line buckles. Each of the weighing modules 2 is connected atop the fork 5. In one embodiment, the weighing modules 2 are directly mounted to to an upper surface of the fork 5 by first drilling screw holes into the top surface of the fork 5, and then installing screws through the weighing modules 2 and into the fork 5. The outer cover 1 is positioned atop the weighing modules 2 opposite the fork 5, and the outer cover 1 is additionally connected to the weighing modules 2 through screws traversing through the outer cover 1 and into the weighing modules 2.

The present invention may also incorporate a spring integrated into the forward end 11 or distal end 12 of the outer cover 1 in order to absorb an impact force should the operator of the forklift operate the forklift in such a manner as to make an impact with the forks 5 to a wall or other solid object.

The various components of the present invention may be made of any suitable material to accomplish the purpose of the present invention and maintain structural integrity. For example, the outer cover 1 and the sensor base 21 of the weighing modules 2 may be made of steel or another metal, or one or more of the components of the present invention may be made of one or more of various types of plastic if desired or if determined to be cost effective, efficient for manufacturing or otherwise adequate to facilitate the purpose of the present invention.

Although the invention has been explained in relation to its preferred embodiment, it is to be understood that many other possible modifications and variations can be made without departing from the spirit and scope of the invention as hereinafter claimed.

What is claimed is:

1. An attachable weighing scale for a forklift comprising:
an outer cover;
a weighing module;
the outer cover being configured to fit over a fork of the forklift;
the outer cover comprising a top cover portion, a proximal end and a distal end;
the top cover portion being configured to sleeve the fork;
the proximal end and the distal end being located opposite to each other along the outer cover;
the weighing module being connected to the outer cover;
the weighing module being located in between the proximal end and the distal end;
the weighing module comprising a flat sensor base and a weighing sensor;
the flat sensor base and the weighing sensor each being connected to the outer cover;
the flat sensor base being configured to flush against an upper surface of the fork without saddling over the fork;
the weighing sensor being configured to be positioned above the upper surface of the fork;
the flat sensor base comprising a sensor receiving portion;
the weighing sensor being received by the sensor receiving portion;
the sensor receiving portion being a receiving slot; and
the weighing sensor being inserted in the receiving slot.

2. The attachable weighing scale for forklifts as claimed in claim 1 comprising:
the weighing sensor being a strain gauge.

3. The attachable weighing scale for forklifts as claimed in claim 1 comprising:
the weighing sensor comprising a first sensor and a second sensor;
the receiving slot comprising a first slot and a second slot;
the first sensor being inserted in the first slot;
the second sensor being inserted in the second slot; and
the first sensor and the second sensor being configured to be positioned above the upper surface of the fork without sandwiching the fork.

4. The attachable weighing scale for forklifts as claimed in claim 1 comprising:
the weighing module being connected to the top cover portion.

5. The attachable weighing scale for forklifts as claimed in claim 1 comprising:
the outer cover comprising a rear cover portion and a locking bracket; and
the locking bracket and the rear cover portion being connected to each other at the proximal end; and
the rear cover portion and the locking bracket being configured to sleeve the fork.

6. The attachable weighing scale for forklifts as claimed in claim 1 comprising:
a power source;
the power source and the weighing module being electronically connected to each other;
the outer cover comprising a rear cover portion;
the rear cover portion being perpendicularly connected to the top cover portion at the proximal end; and
the power source being accommodated within the rear cover portion.

7. The attachable weighing scale for forklifts as claimed in claim 1 comprising:
a digital display; and
the digital display and the weighing module being electrically connected to each other.

8. The attachable weighing scale for forklifts as claimed in claim 1 comprising:
a power source; and
the power source and the weighing module being electronically connected to each other.

9. The attachable weighing scale for forklifts as claimed in claim 1 comprising:
a wireless communication device; and
the wireless communication device and the weighing module being electrically connected to each other.

10. The attachable weighing scale for forklifts as claimed in claim 1 comprising:
another weighing module;
the another weighing module being structurally identical to the weighing module;
the weighing module and the another weighing module being separate from each other;
the another weighing module being connected to the outer cover; and
the another weighing module being located in between the proximal end and the distal end.

11. The attachable weighing scale for forklifts as claimed in claim 10 comprising:
a digital display;
a power source;
a wireless communication device; and
the digital display, the power source, the wireless communication device, the weighing module and the another weighing module being electronically connected to one another.

* * * * *